Feb. 5, 1935.  H. J. EDLUND  1,990,117
KNIFE SHARPENER
Filed Jan. 26, 1934
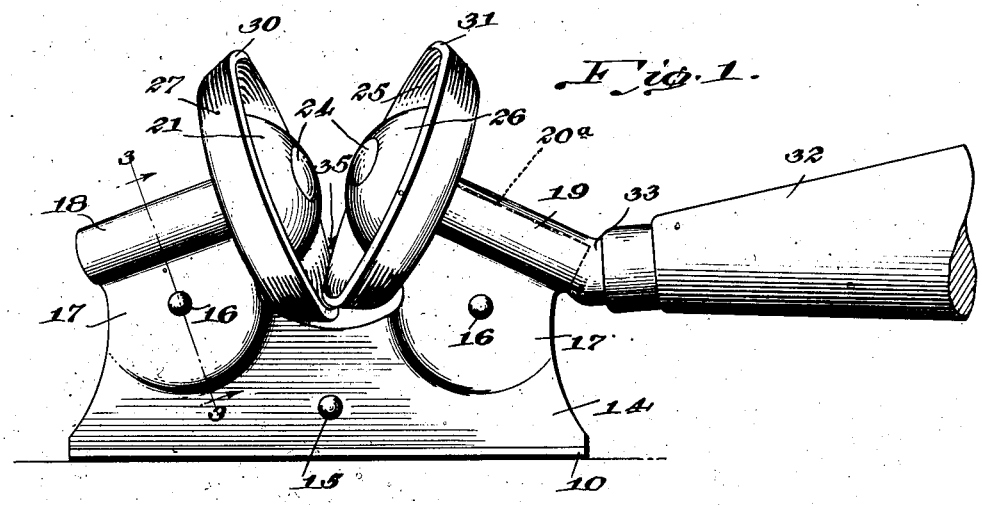
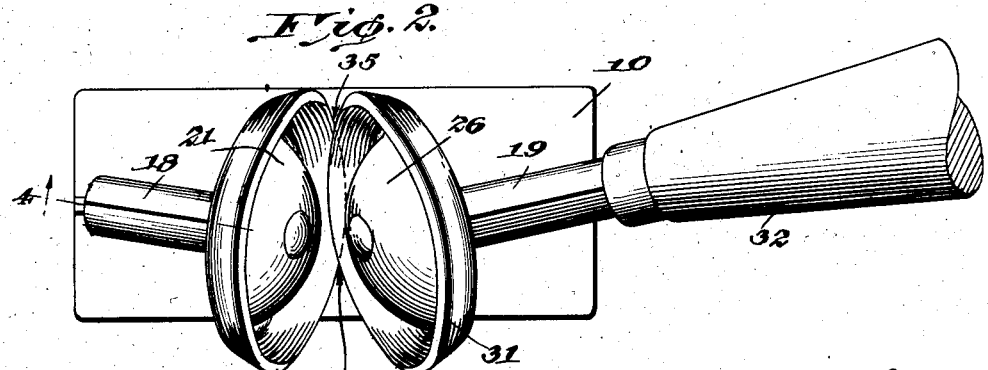
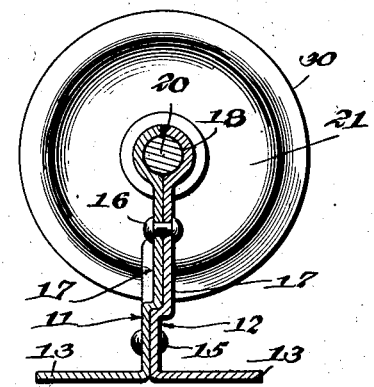
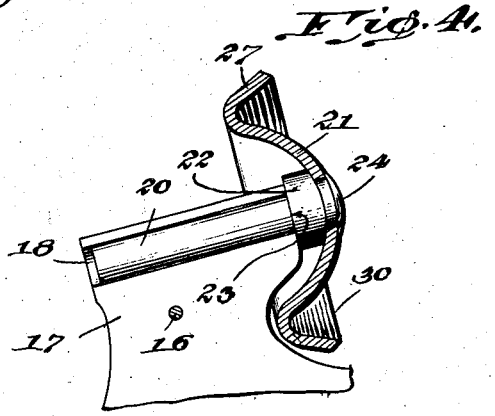
INVENTOR
*H. J. Edlund,*
BY
*Munn, Anderson, Stanley, Foster & Liddy*
ATTORNEYS Patented Feb. 5, 1935

1,990,117

UNITED STATES PATENT OFFICE 1,990,117

KNIFE SHARPENER

Henry J. Edlund, Burlington, Vt.

Application January 26, 1934, Serial No. 708,457

4 Claims. (Cl. 76—87)

This invention relates to knife sharpeners.

An object of the invention is the provision of a knife sharpener which includes a pair of rotatable members disposed in juxtaposition and mounted on shafts, the inner ends of the shafts being directed towards each other at an angle to a vertical plane passing through the adjacent ends of the shafts so that the rotatable members will have their peripheral cutting edges at one side of the shafts in closer relationship than similarly disposed peripheral portions of the rotatable members at the other side of the shafts whereby the knife edge will only engage the first-mentioned peripheral portions of the rotatable members.

Another object of the invention is the provision of a knife sharpener having concavely formed rotatable members located at an acute angle to each other, the rotatable members having in-turned peripheral flanges and being mounted on shafts which are located at an angle to a vertical plane passing through supports of said shafts whereby the peripheral portions of the rotatable members adjacent the apex of the angle formed between the cup-shaped rotatable members will be in closer association at one side of the vertical plane than the opposite peripheral portions on the other side of the vertical plane so that the edge of the knife will make contact only with the first-mentioned peripheral portions to cause rotation of the rotatable members.

A further object of the invention is the provision of a knife sharpener which includes rotatable members having an annular knife edge at their peripheral portions located at an angle to the vertical passing through said members so that certain portions of said members will be in close association to provide a wedge-shaped cutting action between the rotatable members, the cup-shaped members being secured on shafts and mounted in bearings on a base member, said rotatable members having central concave portions facing each other for guiding the edge of a knife onto the closely associated peripheral portions of the rotatable members, the shafts being disposed at such angles with respect to the horizontal plane and the vertical plane that only two adjacent points of the rotatable members will be in contact with the edge of the knife at any time.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claims.

In the drawing:

Figure 1 is a side view of a knife sharpener constructed in accordance with the principles of my invention, Figure 2 is a plan view of the same, Figure 3 is a vertical section taken along the line 3—3 of Figure 1, and Figure 4 is a vertical section taken along the line 4—4 of Figure 2.

Referring more particularly to the drawing, 10 designates a support for the knife sharpener which consists of a pair of L-shaped metal members 11 and 12. Each of the members has a base portion 13 and a vertical portion 14. The vertical members or walls 14 are secured together in any approved manner and rivets 15 and 16 are illustrated as showing one form of means.

Portions 17 of the vertically disposed walls are offset and semi-circular members are formed at the upper ends of these offset members to provide bearings 18 and 19. These bearings, as shown more particularly in Fig. 2, are disposed at an angle to a vertical plane passing through the contacting faces of the vertical walls 14. It will be noted that the bearing 18 is inclined at a greater angle to the vertical plane than the axis of the bearing 19 for a purpose which will be presently explained.

It will also be noted that these bearings are located at an acute angle to a horizontal with the bearing 19 disposed at a greater angle than the bearing 18.

A shaft 20 is mounted in each bearing and these shafts are disposed in the same angular relation as are the bearings 18 and 19.

A concave rotatable member or roller 21 is secured to the shaft in the bearing 18 and a shoulder 22 spaces the outer face of the member 21 from the adjacent end 23 of the bearing 18. The outer end of the shaft 20 is swaged over the outer face of the concave member 21, as shown at 24, for rigidly securing the concave member to said shaft.

A shaft 20ª disposed in the bearing 19 and disclosed in dotted lines is also provided with a swaged-over portion 24. The shaft 20ª has a shoulder constructed similarly to the shoulder 22 on the shaft 20 and a concave member 26 is clamped between the shoulder and the swaged portion 24. An annular inturned flange 25 is formed integrally with the concave member 26 while an inturned annular flange 27 is formed on the member 21.

The periphery of the member 21 is provided with an inclined cutting edge 30 for aiding in sharpening a knife as will be presently explained. The peripheral portion 31 of the member 26 is similarly formed. From this construction it will be seen that the concave members which are secured to their respective shafts 20 and 20ª and mounted in their respective bearings 18 and 19 are, therefore, rotatable. A handle 32 is secured in any approved manner to an extension 33 of the bearing 19.

The operation of my device is as follows: It is important to note that the bearings 18 and 19 are not only disposed in different angular relationship with respect to a vertical plane passing through the contacting surfaces of the vertical walls 14 but they are disposed in a different angular arrangement with respect to a horizontal passing through the securing means or rivets 16. By this arrangement the flange portion 25 of the member 26 is nested slightly within the flange portion 27 of the concave member 21.

The portions of the peripheries of the rotatable members when they reach the point indicated at 35 are at a higher horizontal level than the opposite adjacent points 36. By this arrangement the cutting edge of a knife when placed in a horizontal position will only engage the points 35 so that the discs will be rotated and a uniform sharpening of the knife edge will be had, while the members 21 and 26 will be revolved during the operation.

The concave members 21 and 26 will readily guide the knife edge to the contacting points 35. While the concave members are made of hard steel, said members will not injure the knife edge when the knife edge comes in contact with one of these surfaces for guiding it into the cutting portions of the members 21 and 26. Only a gentle pressure is necessary to produce a cutting edge on the instrument drawn through the sharpener. The members 21 and 26 will always be rotated due to the fact that the contacting points between the knife and the rotatable members are below the axis of the cup-shaped member.

It will also be noted by the particular construction of the loosely mounted shafts 20 and 20ª in the respective bearings 18 and 19 that the rotatable cutters may be moved towards or away from each other with the outward movement being limited by the inner ends of the bearings 18 and 19. The peripheral portions 30 and 31 respectively of the rotatable members 21 and 26 are ground, leaving a very sharp edge.

While I have described the cutters made of hardened steel, it will be appreciated that these members may be formed of emery or other suitable cutting material.

What I claim is:

1. A blade sharpener comprising a base member, bearings supported by the base member, shafts mounted in the bearings, rollers having their peripheries adjacent each other and provided with cutting edges for supporting the edge of a blade in operative relation with said cutting edges of the rollers, the rollers being arranged at an angle to each other so that the edge of the blade will be in contact with a single point on each roller at one side of the shafts, the rollers having concave portions acting as guides for directing the blade on to the cutting edges of the rollers.

2. A blade sharpener comprising a base member, rollers mounted for rotation on the base member and provided with peripheral cutting edges, the rollers having inturned flanges, the flanges of one roller having a portion disposed within a portion of the flange of the other roller so that the peripheral cutting edges will be moving in crossing relationship when the rollers are revolved, the initial crossing points at one side of the centers of the rollers being at a greater distance from the base member than the initial crossing points of the cutting edges at the other side of the centers.

3. A blade sharpener comprising a base member, a pair of cutting rollers mounted for rotation on the base member and disposed at an angle to each other with the lower portion of one roller being at a higher level than the other roller, one of the rollers having an annular lateral extension provided with a cutting edge, the other roller having an annular cutting edge with a portion thereof being nested within the lateral flange of the other roller crossing each other at a point which is common to both cutting edges so that when a knife edge is drawn over a common point the rollers will be revolved to bring other common points into shearing action with the knife edge.

4. A blade sharpener comprising a base member, a pair of cutting rollers mounted for rotation on said base member and disposed at an angle to each other, said rollers having a flange projecting toward each other, the lower portion of a flange of one roller being nested in the lower portion of a flange of the other roller, the flange of each roller having a peripheral cutting edge, the cutting edges crossing each other in a common point at each side of the centers of the rollers, the common point of crossing at one side of the centers being at a greater height from the base member than the common point of crossing at the other side so that a knife edge will engage but one common point and will cause the rollers to revolve and present successive common points to the knife edge when the knife edge is drawn over said points.

H. J. EDLUND.